United States Patent [19]

Ishii et al.

[11] Patent Number: 5,259,630
[45] Date of Patent: Nov. 9, 1993

[54] DEVICE FOR CLAMPING WORKPIECE

[76] Inventors: Masato Ishii, 10482, Takayama-cho, Ikoma-shi, Nara; Yoshiyuki Ohta, 2-9, Shikanodai Nishi 2-chome, Ikoma-shi, Nara, both of Japan

[21] Appl. No.: 961,335
[22] Filed: Oct. 15, 1992

[30] Foreign Application Priority Data

Oct. 16, 1991 [JP] Japan .................. 3-267648

[51] Int. Cl.⁵ ............................. B23B 31/32
[52] U.S. Cl. ....................... 279/2.05; 279/4.05; 279/35; 279/106; 279/127
[58] Field of Search ............. 279/2.05, 4.05, 35, 279/37, 106, 119, 127, 139

[56] References Cited

U.S. PATENT DOCUMENTS

2,714,514 8/1955 Hohwart et al. .......... 279/2.05
4,206,932 6/1990 Felker ...................... 279/4.05

Primary Examiner—Timothy V. Eley
Attorney, Agent, or Firm—Wenderoth, Lind & Ponack

[57] ABSTRACT

A device for clamping a workpiece has a base body rotatable together with a spindle of a machine tool. The base body has a hollow portion defining a space. A piston is mounted in the space so as to be movable back and forth by fluid supplied through passages communicating with chambers defined on both sides of the piston, respectively. A diaphragm is provided over a front portion of the base body with a predetermined gap left therebetween. A peripheral portion of the diaphragm is secured to the base body, while a central portion of the diaphragm engages the piston. A plurality of clamping jaws are provided on the front surface of the diaphragm.

4 Claims, 8 Drawing Sheets

DEVICE FOR CLAMPING WORKPIECE

BACKGROUND OF THE INVENTION

This invention relates to a device for supporting a workpiece to be machined.

Unexamined Japanese Patent Publication 2-269513 discloses a method of clamping a workpiece to be machined, in which the clamping jaws are opened by feeding compressed air into a passage or branched passages through an outer sheath of an air tube or through the air tube, and the jaws are closed to clamp the workpiece by stopping the supply of compressed air or by reducing its pressure after fitting an inner recessed part of the workpiece onto a stopper (outer clamping method).

In another method, an inner protrusion of the workpiece is brought into abutment with the stopper and the clamping jaws engage the workpiece within a recess defined therein. Then by feeding compressed air into the passage or branched passages, the clamping jaws are opened, thus clamping the workpiece (inner clamping method).

The outer clamping method, in which the workpiece is clamped using the restoring force of the diaphragm, has a problem in that the clamping jaws tend to shift outward due to the centrifugal force produced while in rotation in proportion to the mass of the clamping jaws. This reduces the clamping force. Thus, when using this method it was difficult to increase the revolving speed of the workpiece while maintaining safety.

Further, since the outer clamping force of the clamping jaws cannot be reduced below a certain level due to the fact that they are controlled by the restoring force of the diaphragm, the workpiece may be deformed if it is to thin. Thus, it was impossible to machine thin workpieces.

With the inner clamping method, after the clamping jaws are opened and pressed against the inner surface of the workpiece by feeding compressed air to the device, a centrifugal force is produced in proportion to the mass of the clamping jaws while in rotation. Thus, the clamping jaws are pressed more strongly against the workpiece. Thus, the workpiece is pushed outward and may be deformed. It was thus impossible to machine a thin workpiece.

Further, in case of the inner clamping method, if the air compressor or the air tube should be broken, the clamping force will be relieved and an accident may result.

SUMMARY OF THE INVENTION

An object of this invention is to provide a clamping device which can rotate a workpiece at high speed, which can clamp a thin workpiece, which can clamp a workpiece either from the outside or from the inside without being affected by the centrifugal force produced in proportion to the mass of the clamping jaws, and which can clamp a workpiece with the combined force of the diaphragm and the piston.

According to the present invention, there is provided a device for supporting a workpiece comprising a base body rotatable together with a spindle of a machine tool and provided with a hollow portion defining a space, a piston mounted in the space and movable back and forth by supplying fluid through selected ones of said passages, a diaphragm provided on a front side of the base body with a predetermined gap left therebetween and having its peripheral portion secured to the piston and its central part in engagement with the piston, and a plurality of clamping jaws provided on the front surface of the diaphragm.

When clamping the workpiece from its outside, pressurized fluid is fed through the passage into that portion of the space located to the back of the piston to slide the piston forward. As the piston slides, the central part of the diaphragm is pushed forward, thereby spreading open the clamping jaws.

Then, after a workpiece is positioned on the device, the supply of pressurized fluid is stopped to push back the piston under the restoring force of the diaphragm. The clamping jaws thus retract so that the workpiece is clamped by the jaws.

Further, fluid is supplied through the passage into that portion of the space located behind the piston space in order to offset the influence of the centrifugal force and to increase the clamping force. In this case, the piston slides forward while pushing the central part of the diaphragm forward. The clamping jaws are thus opened and the workpiece fitted on the outside of the clamping jaws is clamped.

As described above, according to this invention, since fluid pressure is always applied to one end of the piston while clamping the workpiece, the clamping jaws are prevented from shifting outward under the influence of centrifugal force while in rotation. Thus, this workpiece can be machined with the utmost safety and can be rotated at a high speed.

Also, by adjusting the fluid pressure, a thin workpiece can be clamped without deforming it.

A large clamping force can be applied because this force is produced both by the diaphragm and the piston.

BRIEF DESCRIPTION OF THE DRAWINGS

Other features and objects of the present invention will become the following description taken with reference to the accompanying drawings, in which.

DETAILED DESCRIPTION OF THE PREFERRED EMBODIMENTS

Figure 1:
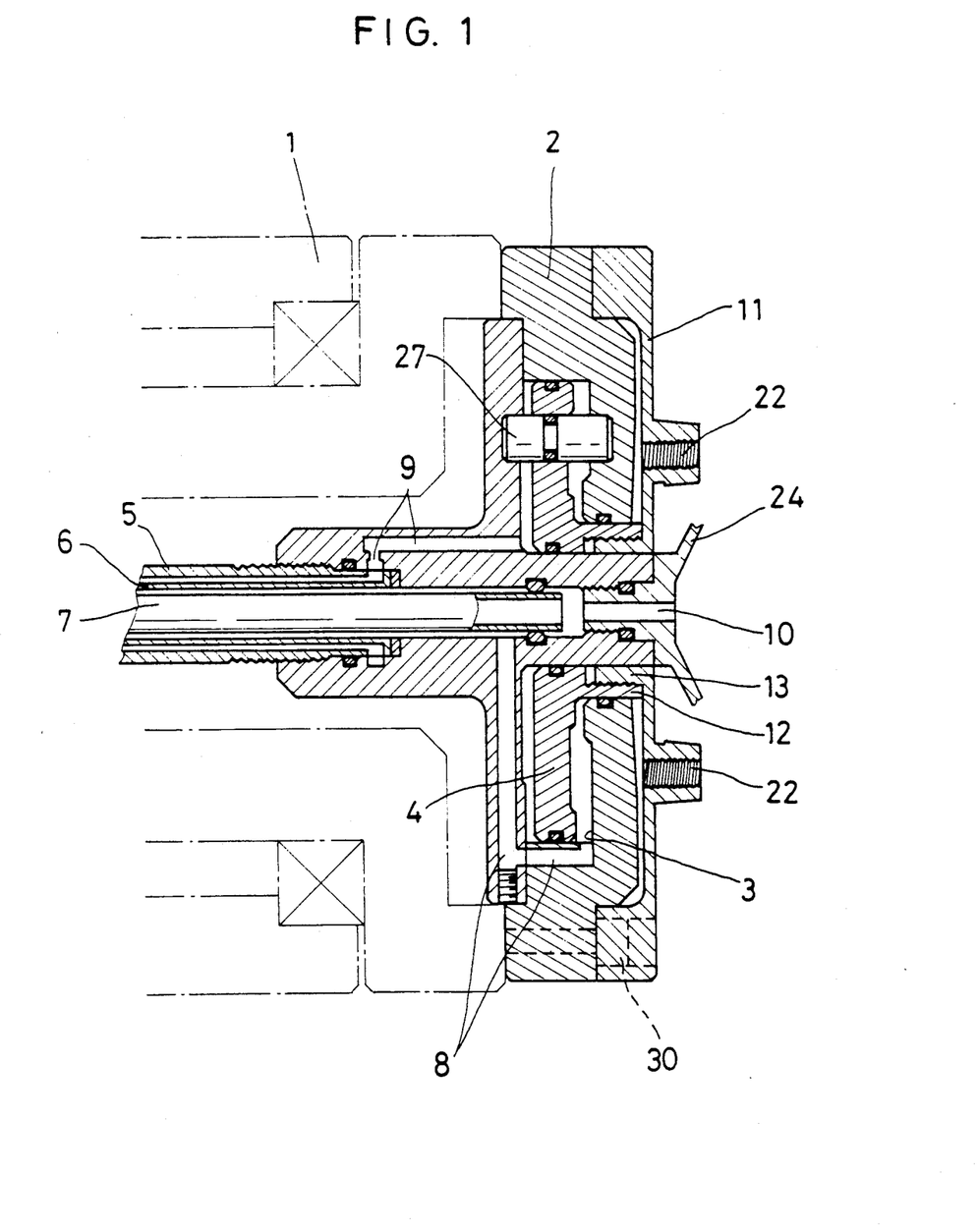
FIG. 1 is a sectional view of the first embodiment of a device for clamping a workpiece according to this invention.
Figure 2:
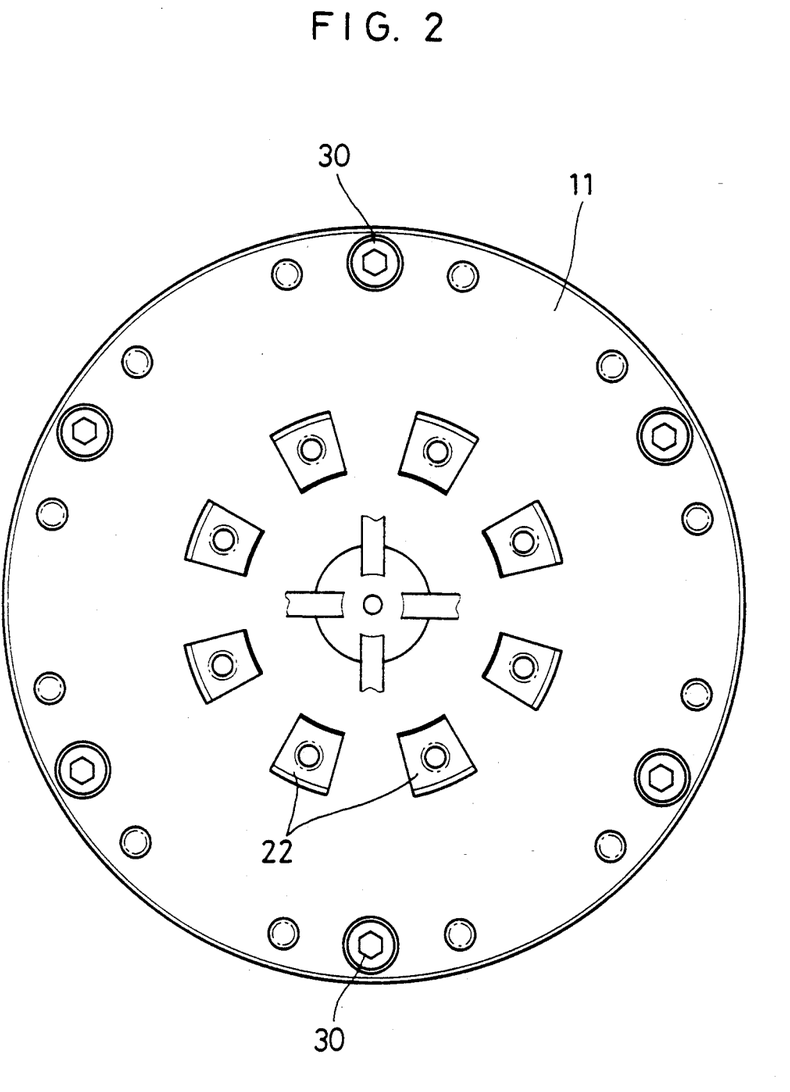
FIG. 2 is a front view of the same.
Figure 3:
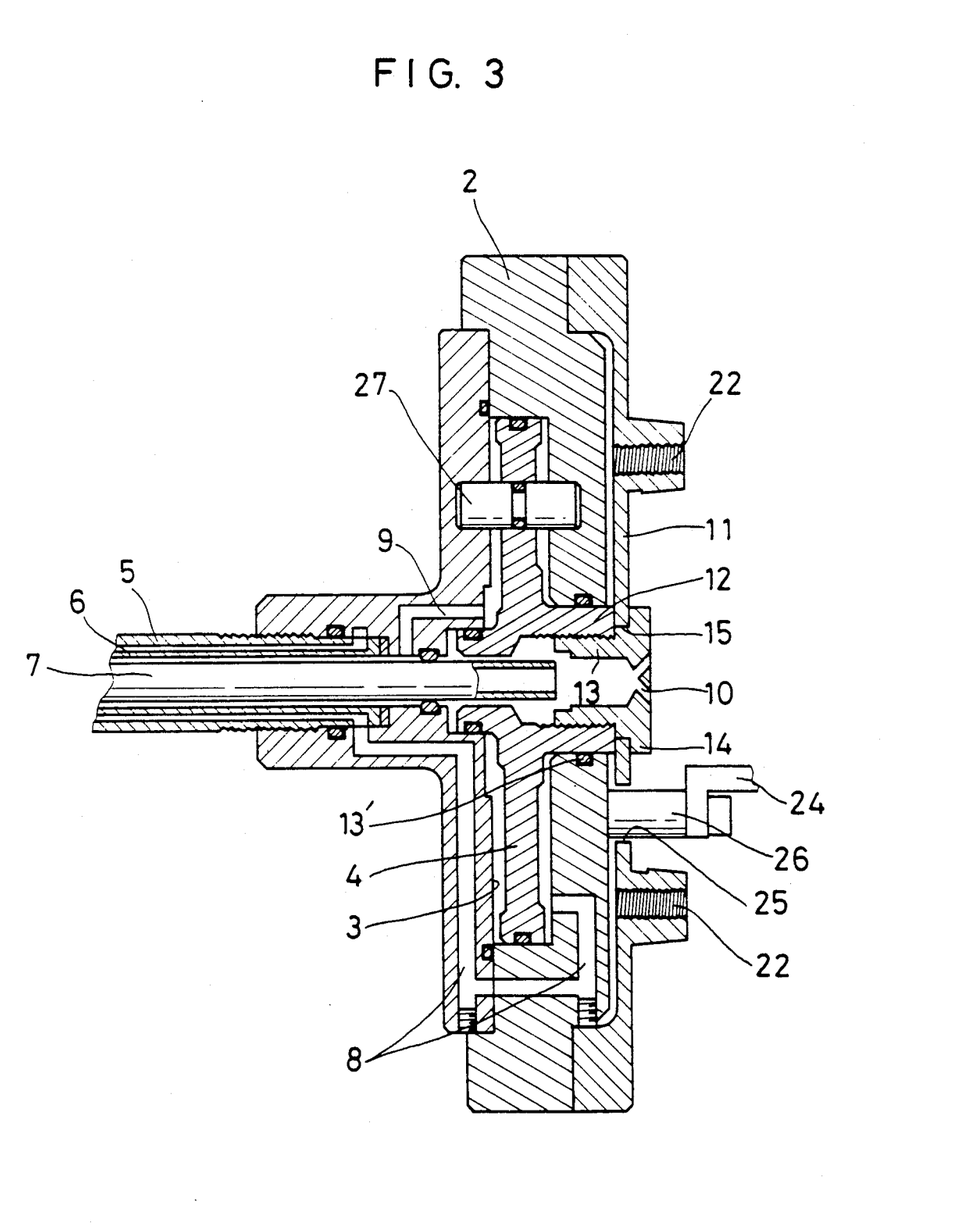
FIG. 3 is a vertical sectional view of the second embodiment.
Figure 5:
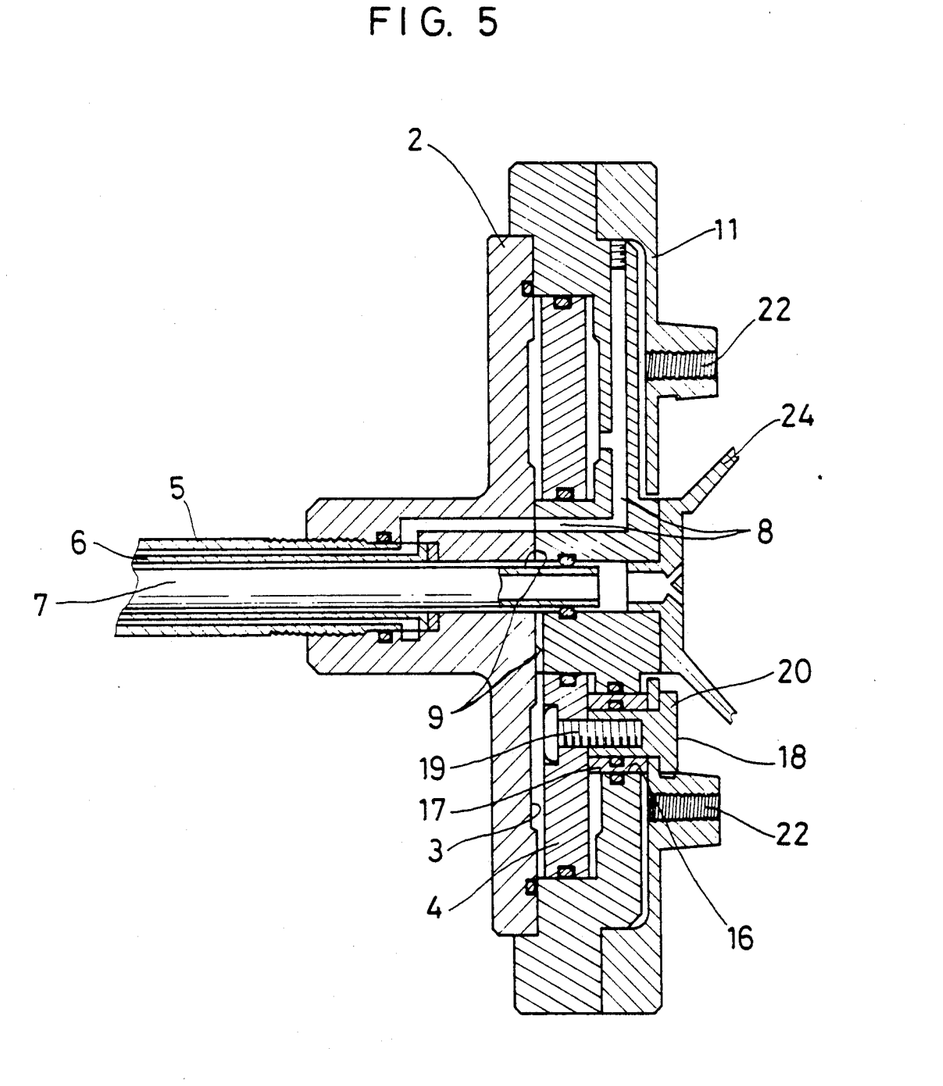
FIG. 5 is a sectional view of the third embodiment.
Figure 6:
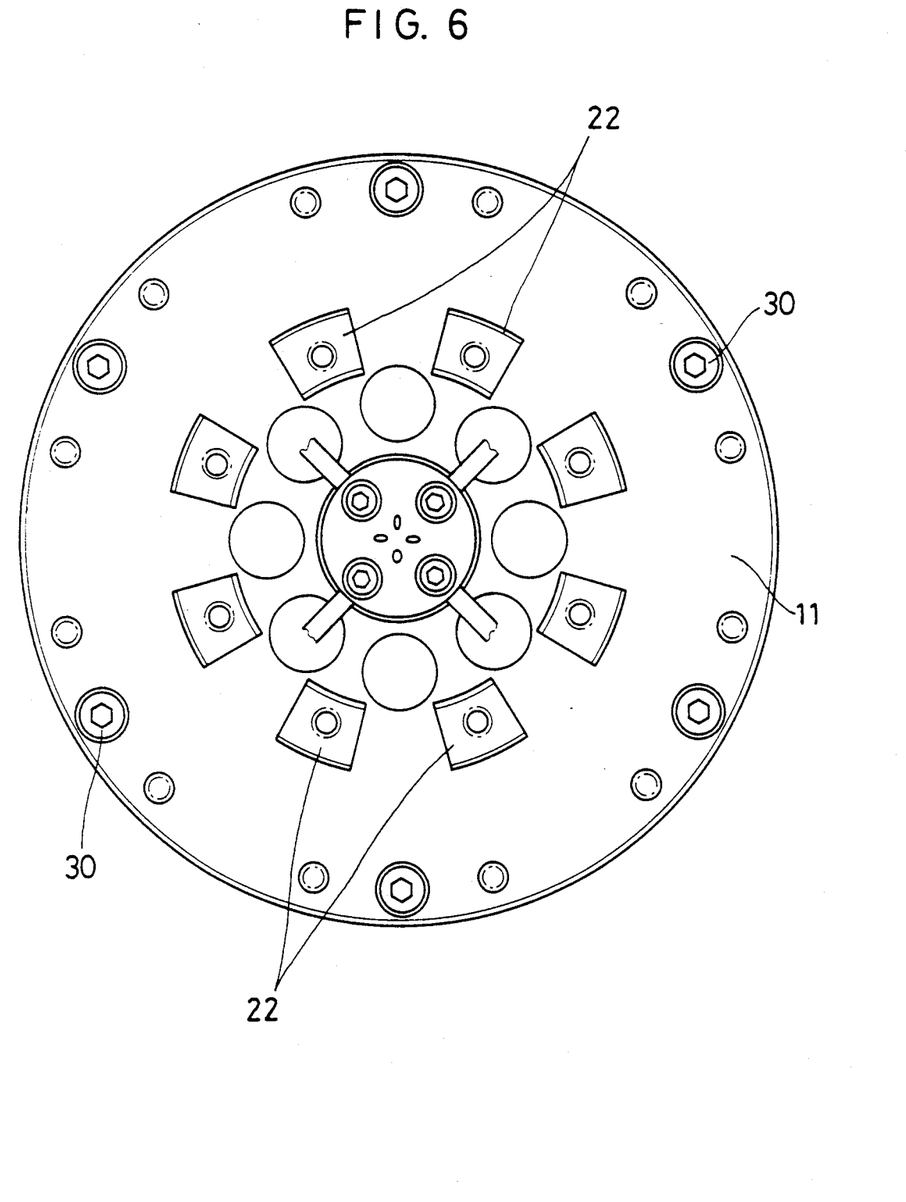
FIG. 6 is a front view of the same.

As shown in FIGS. 1, 3 and 5, a base body 2 is adapted to rotate together with a spindle 1 of a machine tool and defines a space 3 therewithin.

In the space 3 is mounted a piston 4 so as to partition the space into front and rear chambers. The piston 4 is movable in either of back and forth directions by selectively supplying the fluid into respective ones of the chambers.

The device comprises a large-diameter outer pipe 5 adapted to rotate together with the base body 2, a small-diameter inner pipe 6 provided inside the outer pipe 5, with a gap left therebetween, and a coolant liquid supply tube 7 inserted in the inner pipe 6, with a gap left therebetween.

In the embodiment of FIG. 1, a first passage 8 has one end thereof communicating with the gap between the tube 7 and the inner pipe 6 and the other end communicating with the front of the piston 4 mounted in the space 3. A second passage 9 communicates at one end thereof with the gap between the outer pipe 5 and the inner pipe 6 and at the other end with the back of the piston 4.

In the embodiments of FIGS. 3 and 5, a first passage 8 has one end thereof communicating with the gap between the outer pipe 5 and the inner pipe and the other end communicating with the front of the piston 4 mounted in the hollow space 3. A second passage 9 communicates at one end thereof with the gap between the inner pipe 6 and the tube 7 and at the other end with the back of the piston 4.

In order to allow the outer pipe 5, inner pipe 6 and tube 7 to rotate together with the base body 2, they comprise movable portions connected to fixed portions through a rotary joint (not shown).

The space 3 is annular in order to accommodate a central passage through which coolant liquid is supplied from the tube 7 to a nozzle 10 which sprays the liquid over the workpiece A. For the same purpose, the piston 4 is also annular.

A diaphragm 11 is provided at the front surface of the base body 2 with a predetermined gap defined therebetween and has its outer edge secured to the peripheral edge of the base body 2 by members 30 such as bolts. The central portion of diaphragm 11 is kept in engagement with the central portion of the piston 4.

The diaphragm 11 has to have a sufficiently large tensile strength and is formed, for example, by treating a deposition-hardened alloy with solution, machining it and then age hardening the material machined by heat treating the material until its hardness reaches a predetermined value.

In order to secure the piston 4 and the diaphragm 11 together, as shown in FIGS. 1 and 3, a rearwardly protruding cylindrical portion 13 as a leakage preventive means may be provided on the central pat of the diaphragm 11 so as to threadedly engage a forwardly protruding cylindrical portion 12 provided on the central part of the piston 4. Also, as shown in FIG. 3, the nozzle 10 may be screwed into the cylindrical portion 12 of the piston 4 to sandwich the edge 15 defining a central opening of the diaphragm 11 between a flange 14 of the nozzle 10 and the end face of the cylindrical portion 12.

Alternatively, as shown in FIG. 5, a respective collar 17 and a box nut 18 fitted in the collar 17, both provided with leakage preventive means, may be slidably inserted in each of a plurality of holes 16. Screws 19 are tightened into the box nuts 18 to fix the box nuts 18 to the piston 4. The diaphragm 11 is sandwiched between the end faces of the collars 17 and heads 20 of the box nuts 18.

Figure 4:
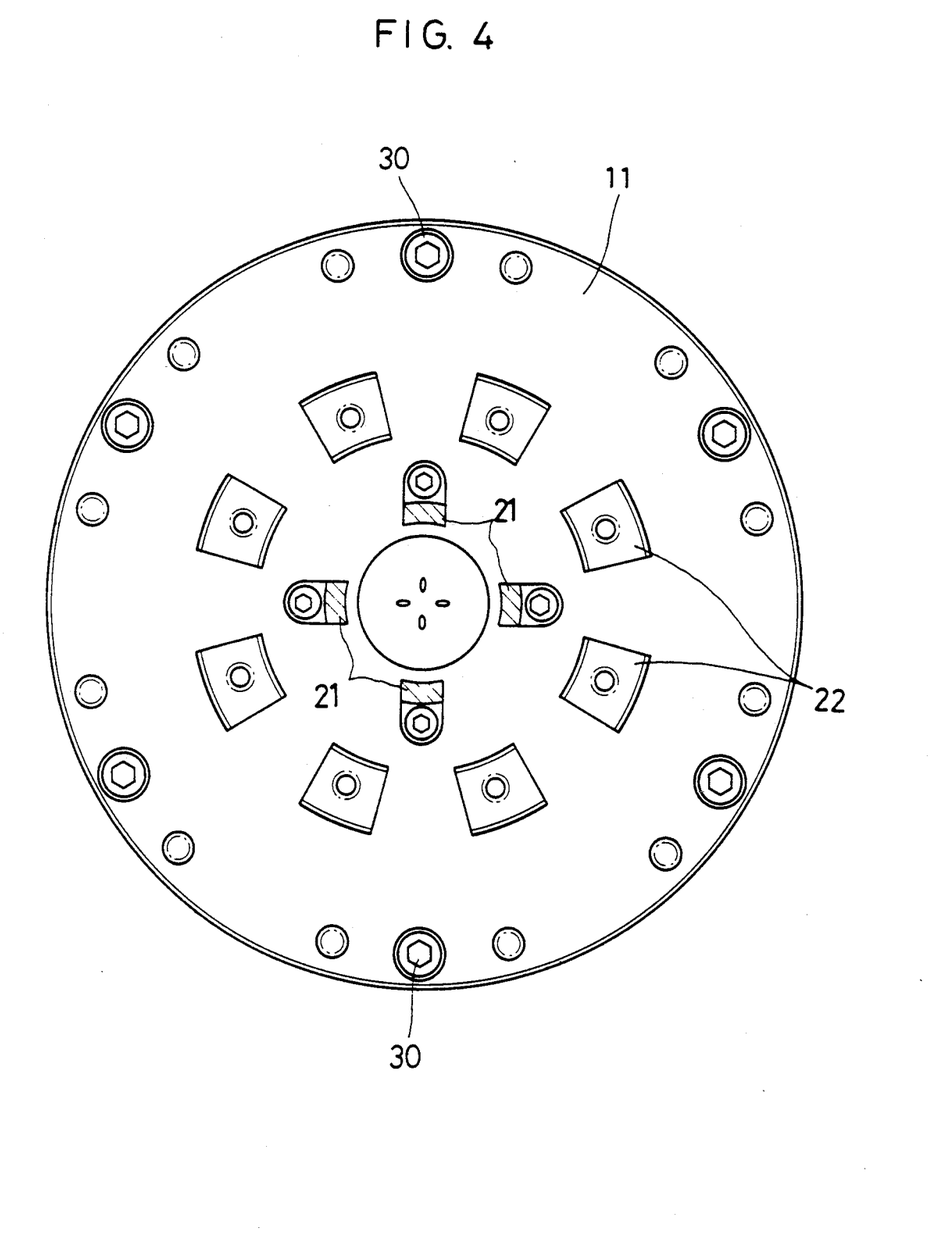
FIG. 4 is a front view of the same.
Figure 7:
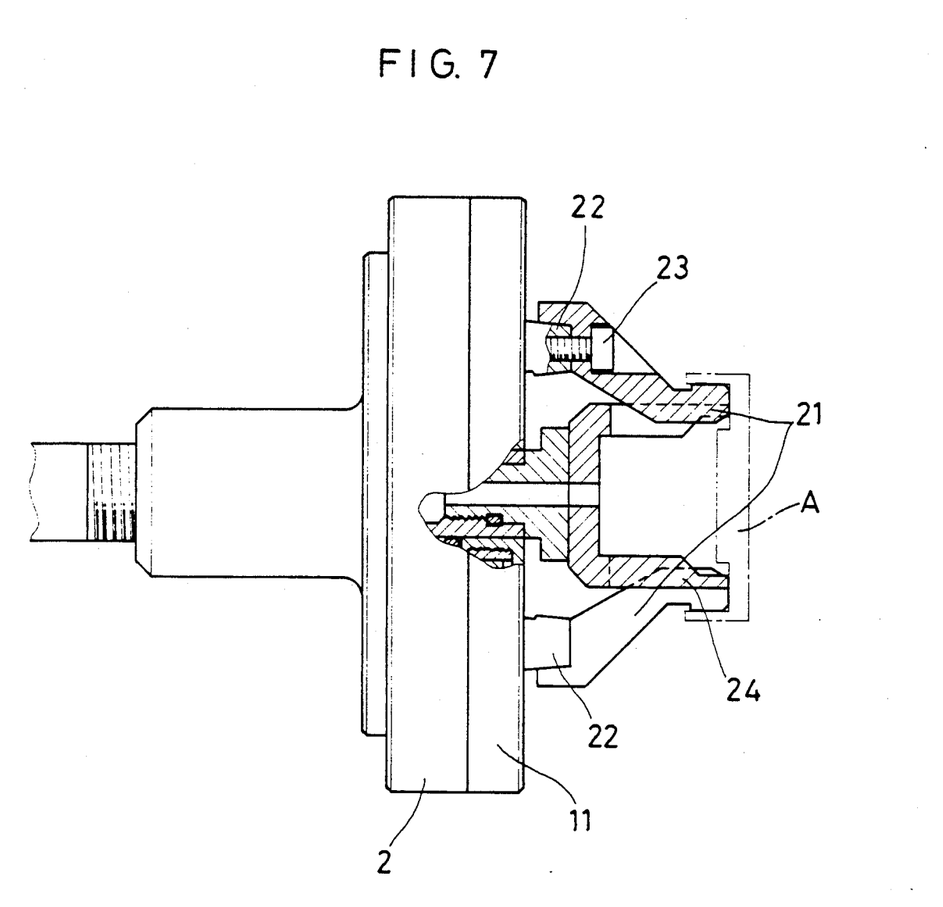
FIG. 7 is a partially cutaway side view of the device showing a workpiece in a clamped state.
Figure 8:
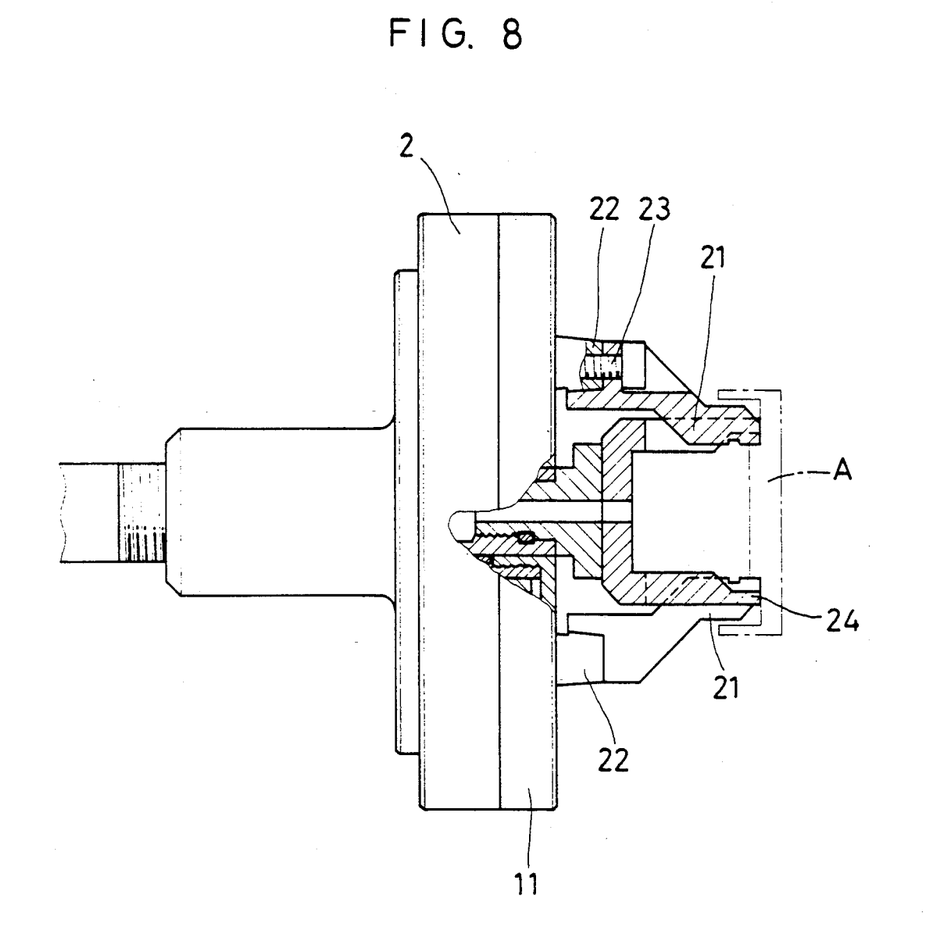
FIG. 8 is a partially cutaway side view showing a workpiece in another clamped state.

Jaws 21 for clamping the workpiece A are arranged on the front of the diaphragm 11. (FIGS. 7 and 8) As shown in FIGS. 4, 7 and 8, a large number of clamping jaws 21 are arranged radially, and are secured to threaded sheaths 22, integral with the front surface of the diaphragm 11, by means of bolts 23. There are two kinds of work clamping jaws. Those shown in FIG. 7 are of a type that clamp the workpiece from the inside while those shown in FIG. 8 are of a type that clamp the workpiece from the outside.

In the figures, numeral 24 designates a stopper for positioning the workpiece A. The stoppers 24 may protrude from the nozzle 10 (as shown in FIGS. 1 and 5) or may be provided on leg members 26 that extend through windows 25 formed in the diaphragm 11 and are fixed to the base body 2 (as shown in FIG. 3). A guide pin 27 is provided to prevent the rotation of the piston 4 and to guide the forward and backward movement of the piston 4.

With this arrangement, when fluid (air) is fed under pressure through the first passage 8 into the space 3 to the front of the piston 4, the piston 4 slides in such a direction as to pull the central part of the diaphragm 11 rearwardly. As a result, the clamping jaws 21 will close or incline radially inwardly together with the threaded sheaths 22 integral with the diaphragm 11.

In this state, as shown in FIG. 7, the workpiece A is placed on the stoppers 24 so as to be set in a predetermined position, with the clamping jaws 21 located inside the inner peripheral wall of the workpiece A and kept out of engagement therewith.

Then, by stopping the supply of compressed fluid to the front of the piston 4, the piston is allowed to move back to its original position by the restoring force of the diaphragm 11, so that the jaws 21 are spread open until they are pressed against the inner peripheral wall of the workpiece A. Thus, the workpiece A is clamped in position.

In order to increase the clamping force with the jaws 21, fluid under pressure is fed through the second passage 9 into the space 3 to the back of the piston 4. In other words, by feeding the pressurized fluid to the back of the piston 4, the piston 4 slides further forward, pushing out the central part of the diaphragm 11. Thus, the jaws 21 are pressed harder against the inner peripheral wall of the workpiece A.

FIG. 8 shows the clamping jaws for clamping the workpiece from outside. In this case, the piston 4 is initially moved forward by feeding pressurized fluid to the back of the piston 4 through the second passage 9. The central part of the diaphragm 11 is pushed forward so that the jaws 21 are spread open.

Then, as shown in FIG. 8, the workpiece is supported on the stoppers 24 to hold the workpiece A in a predetermined position. When the supply of pressurized fluid is stopped in this state, the piston 4 will move back to its original position by the restoring force of the diaphragm 11. The jaws 21 will retract (incline radially inward) and be pressed against an annular rib formed on the peripheral wall of the workpiece A at a portion surrounded by its annular flange, thereby clamping the workpiece A in position.

In order to offset the influence of the centrifugal force and to increase the clamping force, fluid under pressure is fed through the first passage 8 into the space 3 to the front of the piston 4. In other words, by feeding the pressurized fluid, the piston 4 slides rearwardly while pulling the central part of the diaphragm 11. Thus, the jaws 21 are pressed harder against the workpiece.

The workpiece may, of course, be clamped at any other part thereof.

We claim:

1. A device for use in clamping a workpiece to a machine tool, said device comprising: a base having a hollow portion defining a space, a piston slidably received within the hollow portion of said base and partitioning said space into a front chamber defined in front of the piston and a rear chamber defined behind the piston, means by which fluid can be supplied to and discharged from said chambers, a diaphragm extending over a front portion of said base with a gap being defined therebetween, said diaphragm having a peripheral portion fixed relative to said base, and said diaphragm having a central portion fixed relative to said piston so as to be reciprocatable therewith, and a plurality of clamping jaws disposed on a front surface of said diaphragm opposite said gap.

2. The device for use in clamping a workpiece to a machine tool as claimed in claim 1, wherein said means comprises a plurality of tubular members defining passageways in communication with said front and said rear chambers, respectively.

3. In a machine tool having a spindle, a device for clamping a workpiece to the spindle comprising: a base body secured to the spindle so as to rotate therewith, said base body having a hollow portion defining a space, a piston slidably received in the hollow portion of said base body and partitioning said space into a front chamber defined in front of the piston and a rear chamber defined behind the piston, means by which fluid can be selectively supplied to and discharged from chambers, a diaphragm extending over a front portion of said base body with a gap behind defined therebetween, said diaphragm having a peripheral portion fixed relative to said base body, and said diaphragm having a central portion fixed relative to said piston so as to be reciprocatable therewith, and a plurality of clamping jaws disposed on a front surface of said diaphragm opposite said gap.

4. The device for clamping a workpiece to the spindle of a machine tool as claimed in claim 3, wherein said means comprises a plurality of tubular members defining passageways in communication with said front and said rear chambers, respectively.

* * * * *